(No Model.) 6 Sheets—Sheet 1.

G. FLETCHER & W. P. ABELL.
CUT-OFF MECHANISM FOR SLIDE VALVES.

No. 485,267. Patented Nov. 1, 1892.

Witnesses. Inventors (No Model.) 6 Sheets—Sheet 2.

G. FLETCHER & W. P. ABELL.
CUT-OFF MECHANISM FOR SLIDE VALVES.

No. 485,267. Patented Nov. 1, 1892.

Witnesses.
John Cullen
Jeremiah Enright

Inventors
George Fletcher
and
Wm. Price Abell.
By John J Halsted & Son
their Attys (No Model.) 6 Sheets—Sheet 3.
G. FLETCHER & W. P. ABELL.
CUT-OFF MECHANISM FOR SLIDE VALVES.
No. 485,267. Patented Nov. 1, 1892.
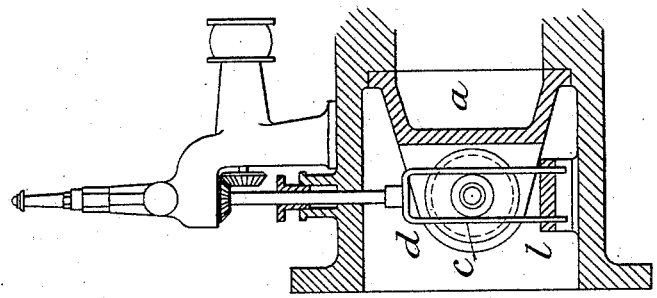
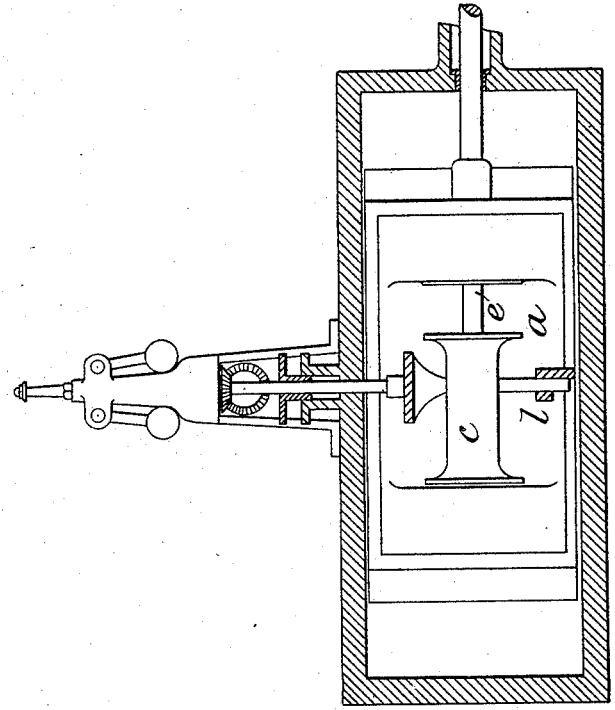

(No Model.) 6 Sheets—Sheet 4.

G. FLETCHER & W. P. ABELL.
CUT-OFF MECHANISM FOR SLIDE VALVES.

No. 485,267. Patented Nov. 1, 1892.

Witnesses.
Inventors.

(No Model.) 6 Sheets—Sheet 5.
G. FLETCHER & W. P. ABELL.
CUT-OFF MECHANISM FOR SLIDE VALVES.

No. 485,267. Patented Nov. 1, 1892.

Witnesses.
John Cullen
Jeremiah Enright

Inventors
George Fletcher
W<sup>m</sup> Price Abell
By John J Halsted & Son
their atty's (No Model.) 6 Sheets—Sheet 6.
G. FLETCHER & W. P. ABELL.
CUT-OFF MECHANISM FOR SLIDE VALVES.
No. 485,267. Patented Nov. 1, 1892.
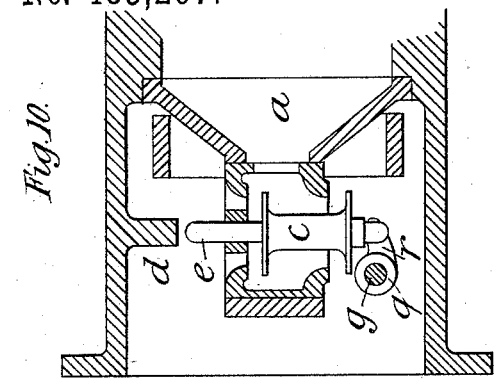
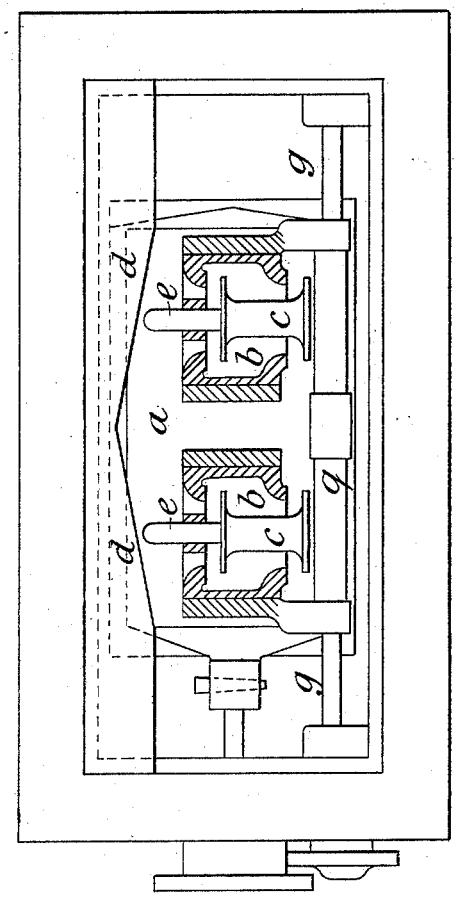
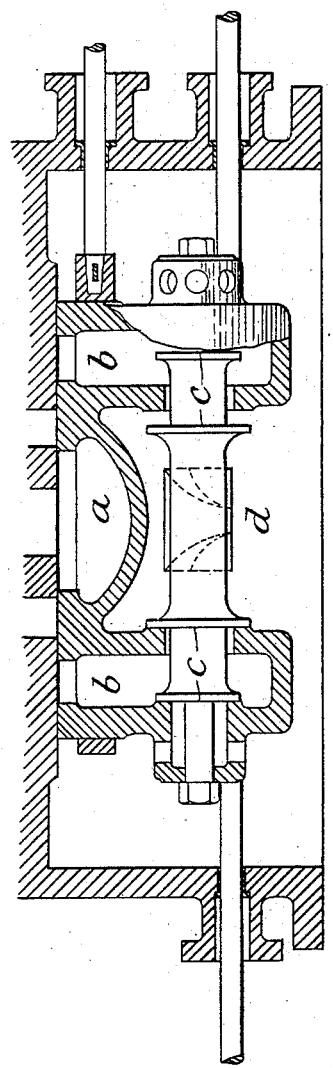
Witnesses. Inventors.

UNITED STATES PATENT OFFICE.

GEORGE FLETCHER, OF DERBY, ENGLAND, AND WILLIAM PRICE ABELL, OF ESSEQUEBO, BRITISH GUIANA.

CUT-OFF MECHANISM FOR SLIDE-VALVES.

SPECIFICATION forming part of Letters Patent No. 485,267, dated November 1, 1892.

Application filed November 18, 1891. Serial No. 412,333. (No model.)

*To all whom it may concern:*

Be it known that we, GEORGE FLETCHER, residing at Derby, England, and WILLIAM PRICE ABELL, residing at Essequebo, British Guiana, subjects of the Queen of Great Britain, have jointly invented new and useful Improvements in Automatic Cut-Off Mechanism for the Slide-Valves of Steam and other Engines, of which the following is a specification.

Our invention relates to automatic cut-off mechanism of the kind forming the subject of British Letters Patent granted to one of us, dated November 4, 1884, No. 14,577, and of United States Letters Patent, dated November 18, 1884, No. 308,181, granted to J. H. Man, and in which cut-off valves adapted to be closed by differential pressure are employed.

The object of our present invention is to provide improved means for controlling the movements of such valves and principally to effect the positive opening of the same; and to this end it comprises the improvements hereinafter described.

Figure 1:
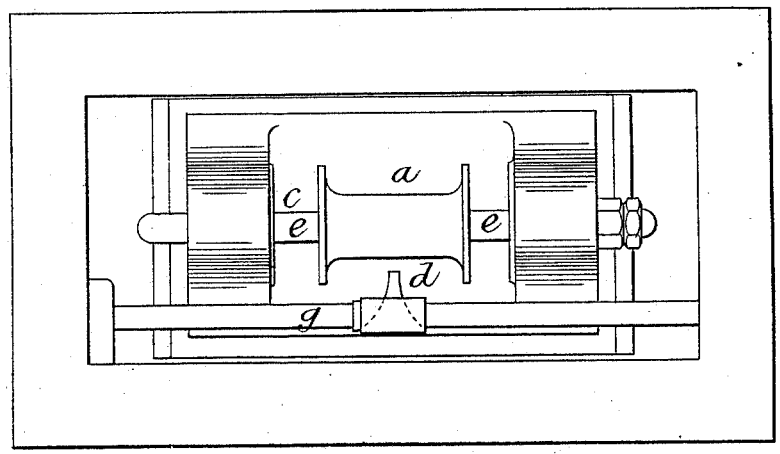
Figure 2:
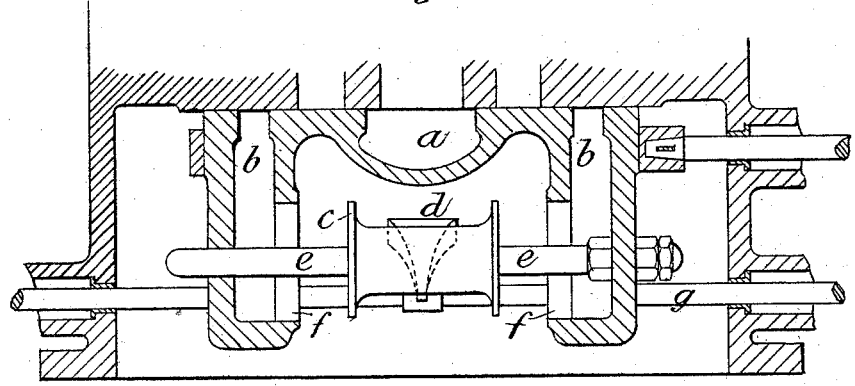
Figure 3:
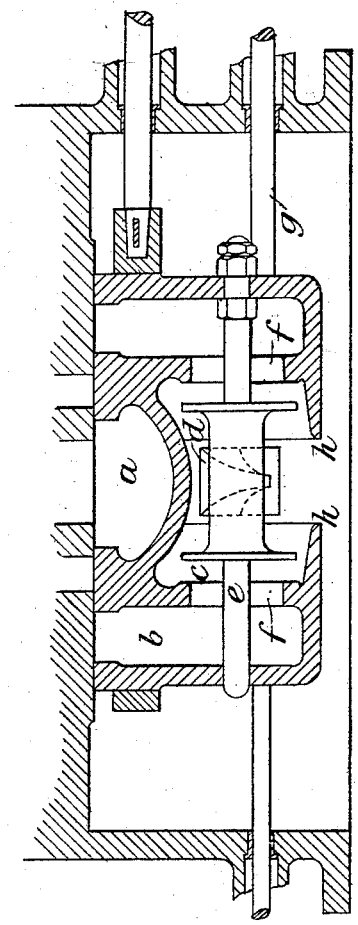
Figure 7:
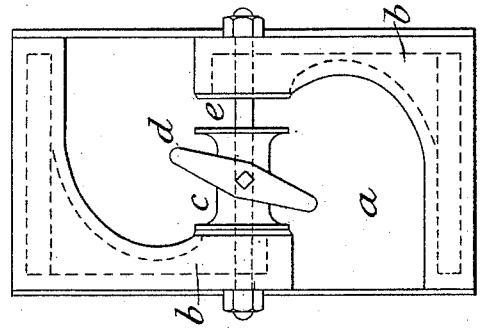
Figure 6:
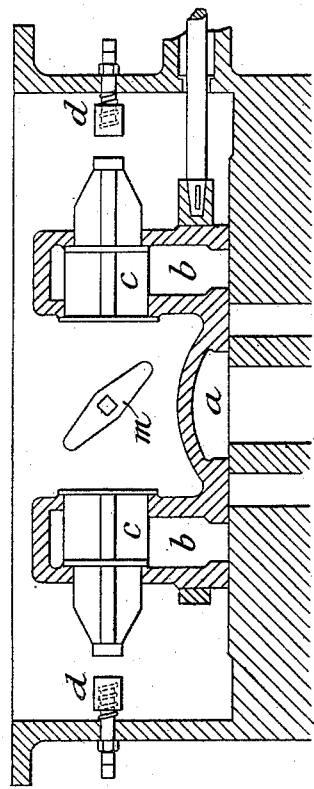
Figure 8:
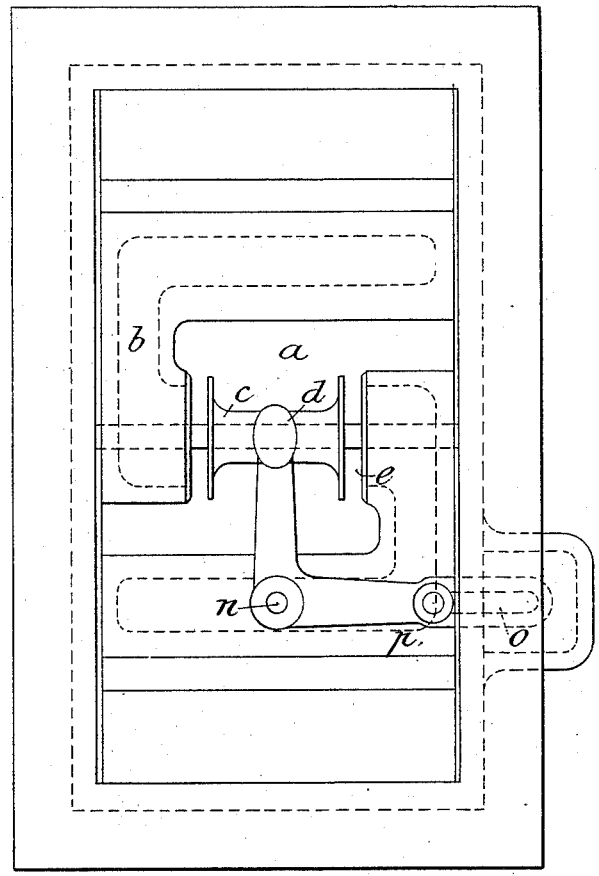

In the accompanying drawings, Figures 1 and 2 are an elevation and sectional plan of a valve-chest and a slide-valve provided with our improvements. Figs. 3 and 4 are respectively an elevation and a transverse section of a modification of part of the same. Figs. 5 and 6 are views similar to Fig. 2, illustrating slight modifications. Figs. 7 and 8 are a sectional elevation and transverse section, respectively, illustrating another modification. Fig. 9 is a sectional plan showing a slide-valve provided with two cut-off valves having double faces and double seats. Fig. 10 is an elevation showing an arrangement of slide-valves and cut-off valve suitable for a vertical engine, and Fig. 11 is an elevation showing another arrangement of valves suitable for a vertical engine. Figs. 12 and 13 are a sectional elevation and transverse section, respectively, showing a slide-valve provided with two cut-off valves of similar construction, but arranged in a different manner to those shown in Fig. 6. Fig. 14 is a sectional plan showing a slide-valve provided with a single cut-off valve having double faces and double seats. Fig. 15 is a view showing a stationary cut-off valve.

Similar letters of reference indicate corresponding parts in the several figures.

$a\ a$ indicate the slide-valves; $b\ b$, passages therein through which the motive fluid passes to the induction-ports of the cylinder; $c\ c$, the cut-off valves for controlling the flow of motive fluid through the said passages, and $d\ d$ two-faced or double cam-surfaces or tappets or stops which regulate the operation of the cut-off valves.

As shown in Figs. 1 and 2, the cut-off valve $c$, which is provided with a recess between its two faces, is adapted to slide upon a spindle $e$, so as to close one or the other of the ports or openings $f$, communicating with the passages $b$, and the tappet $d$, which projects into the said recesses, is of a wedge or cam shape and is mounted upon a shaft $g$ in such a manner that by rotating the said shaft $g$ the tappet can be moved according to the cut-off required. This shaft $g$ is connected with the governor of the engine, so that the position of the tappet $d$ is regulated according to the speed of the engine. When the slide-valve is in motion and the cut-off valve $c$ rests loosely on the spindle $e$, it will travel in the same direction as the slide-valve until one of its ends comes into contact with the tappet $d$. During the further movement of the slide-valve the spindle $e$ slides through the cut-off valve until the seat around one of the openings of a passage $b$ comes so close to the said valve that the velocity of the steam or air flowing into the passage, together with the difference of pressure in the passage and in the valve-chest, causes one end of the cut-off valve to close against its seat to cut off the supply of motive fluid. The valve will then remain closed and travel with the slide-valve until the motion of the latter is reversed. On the return stroke the other end of the cut-off valve comes into contact with the tappet, thereby drawing the end of the valve first referred to away from its seat, and so on, the same movements taking place alternately at opposite ends of the valve. When the tappet is in such a position that only the thin end or apex comes into contact with the valve, the said cut-off valve will come to rest later than if it came into contact with the wider part of the said tappet, thereby allowing a longer period of time to elapse, and consequently a greater portion of the piston-stroke to be performed before the motive fluid is cut off.

In Figs. 3 and 4 the tappet is shown constructed so as to come into contact with the cut-off valve at two points—one on each side of the spindle $e$—instead of at one point, as shown in Figs. 1 and 2. By this arrangement the shock caused by the cut-off valve striking the tappet is more equally distributed and the tendency to damage decreased.

In Fig. 5 the valve $a$ is shown provided with recesses $a'$, into which bosses or projections $a^2$ on the cut-off valve are designed to enter and fit, the air or vapor contained in the said recesses serving as a cushion to lessen the shock of the cut-off valve against its seats when closing. Instead of utilizing the air or vapor as a cushion we may employ in the recesses $a'$ springs of metal or elastic material, such as india-rubber.

In the modification of our invention shown in Fig. 6 the arrangement is substantially the same as that hereinbefore described, except that guide-flanges $h$ are arranged around the openings to the passages $b$, in order to direct the steam or air so as to flow over the edges of the ends of the cut-off valves rather than to flow into the said openings from all directions, thereby insuring a greater sensitiveness and more immediate action than would otherwise be obtained.

In Figs. 7 and 8 the tappet $d$, instead of being connected to the rotary spindle $g$, is connected directly to the governor-spindle, by which it is raised and lowered, the bottom end of the said tappet being held in position by means of a guide-bracket $l$. The action of the valve in this case is the same as that hereinbefore described.

In the arrangement shown in Fig. 9, instead of using a single valve, as hereinbefore described, we employ two cut-off valves, one in connection with each passage $b$. In this case the closing of the valves is effected by the use of a double-ended lever $m$, the inclination of which regulates the point at which the closing shall take place. The opening of the cut-off valves is effected by means of the adjustable stops $d\ d$ in the walls of the valve-chest.

In the arrangement shown in Fig. 10, which is especially applicable for use in a vertical-cylinder engine, the cut-off valve is represented as moving in a line at right angles to the line of motion of the slide-valve. The tappet $d$ is in this case similar in construction to the lever $m$, described with reference to Fig. 9; but the valve $c$, instead of striking directly upon the ends of the said tappet, strikes the same upon the sides and then slides along it.

In the arrangement shown in Fig. 11, which also represents a slide-valve having a cut-off valve moving in a line at right angles to the line of motion, the tappet $d$ is at one end of a bell-crank lever, which is free to move upon a pin or stud $n$, fixed to the slide-valve. The end of the bell-crank lever which does not serve as the tappet is slotted, as at $o$, and is free to move about a movable pin $p$. When the slide-valve $a$ is in a central position, the tappet end of the bell-crank lever will be in a vertical position and the slotted end in a horizontal position, and if a reciprocating motion is given to the slide-valve the tappet end of the said lever will deviate to the right-hand side of the vertical line when the valve is moving upward and the left-hand side when the valve is moving downward. The amount of deviation depends on the distance of the pin $p$ from the vertical center line of the slide-valve, thus determining the position of the cut-off valve. The pin $p$ is moved in the slot $o$ by means of the governor.

In the arrangement shown in Figs. 12 and 13 the slide-valve $a$ is provided with two cut-off valves $c\ c$, arranged and operating at right angles to the line of motion of the slide-valve. Each valve $c$ is provided with a spindle $e$, projecting through the top of one of the passages $b\ b$, and the inclined surfaces $d\ d$ are stationary, the spindles of the cut-off valves during the reciprocation impinging against the said inclined surfaces, whereby the valves $c\ c$ are caused to open. $g$ is a spindle connected to the engine-governor and having a sleeve $q$ free to slide upon it, so as to move with the valve $a$, but working on a feather-key, so as to turn with the said spindle. Integral with the sleeve $q$ are two small levers $r\ r$, which when the spindle $g$ is turned by the governor adjust the position of the cut-off valves $c\ c$ so that the pressure of steam closes them, the two faces of each valve being of different areas to enable this to be effected. When the slide-valve $a$ in moving nears one end of the valve-chest, the spindle $e$ nearest the said end comes into contact with the inclined surface $d$, also at the said end, and causes its valve $c$ to open, the amount of such opening being controlled by one of the levers $r$.

In the arrangement shown in Fig. 14 the cut-off valve is provided at each end with double faces $c\ c$ and double seats, and is operated upon a cam or tappet $d$, similarly to the valve shown in Fig. 1. In this arrangement, however, the steam flows into the passages $b\ b$, past the two faces $c$ and $c$ at each end of the valve, as in the arrangement shown in Figs. 6, 9, and 10.

In Fig. 15 the cut-off valve $c$ is represented as a stationary valve, it being secured by a bracket $c'$ to the wall of the valve-chest.

Having now particularly described and ascertained the nature of our said invention and in what manner the same is to be performed, we declare that what we claim is—

1. The combination of a main valve provided with steam-passages and having ports facing each other with a cut-off valve carried by such main valve and retarded in its movements by a tappet whose position is controlled by the governor and whereby when said ports are severally sufficiently near the cut-off valve the differential pressure of the steam will cause the cut-off valve to move and close the port.

2. The combination of the main valve having passages $b\,b$ therein and openings $f\,f$, a spindle $e$, on which is the cut-off valve $c\,c$, and an adjustable tappet $d$, the combination being and operating substantially as set forth.

3. In combination with the main valve having the described passages and openings therein and with the spindle and an adjustable tappet, a double cut-off valve between the two openings or ports, all substantially as set forth.

4. In combination, the main valve having the described passages and openings or ports therein, the spindle carrying a double cut-off valve between the two ports, and an adjustable tappet having double cam-faced surfaces, all substantially as set forth.

5. The combination, with a slide-valve having cut-off valves adapted to be operated as described, of flanges for directing the motive fluid into the openings covered by the said cut-off valves, substantially as described.

GEORGE FLETCHER.
W. PRICE ABELL.

Witnesses to the signature of George Fletcher:
HENRY MOORE,
WILLIAM FREDERICK ORDISH.

Witnesses to the signature of William Price Abell:
ALEX. ALEXANDER,
WM. DUNCAN.